US010258945B2

(12) United States Patent
Lucon et al.

(10) Patent No.: US 10,258,945 B2
(45) Date of Patent: Apr. 16, 2019

(54) MECHANICAL RESONANT SYSTEM

(71) Applicant: Resodyn Corporation, Butte, MT (US)

(72) Inventors: Peter Lucon, Butte, MT (US); Brian Jay Seaholm, Butte, MT (US)

(73) Assignee: Resodyn Corporation, Butte, MT (US)

( * ) Notice: Subject to any disclaimer, the term of this patent is extended or adjusted under 35 U.S.C. 154(b) by 329 days.

(21) Appl. No.: 15/029,959

(22) PCT Filed: Oct. 22, 2014

(86) PCT No.: PCT/US2014/061768
§ 371 (c)(1),
(2) Date: Apr. 15, 2016

(87) PCT Pub. No.: WO2015/061448
PCT Pub. Date: Apr. 30, 2015

(65) Prior Publication Data
US 2016/0236162 A1    Aug. 18, 2016

Related U.S. Application Data

(60) Provisional application No. 61/894,271, filed on Oct. 22, 2013.

(51) Int. Cl.
*B01F 11/00* (2006.01)
*B06B 1/04* (2006.01)
(Continued)

(52) U.S. Cl.
CPC ...... *B01F 11/0097* (2013.01); *B01F 11/0082* (2013.01); *B01F 15/06* (2013.01);
(Continued)

(58) Field of Classification Search
CPC .. B01F 11/0082; B01F 15/06; B01F 11/0097; B01F 2015/061; B06B 1/045; H02K 9/02; H02K 3/30; H02K 9/04; H02K 33/18
See application file for complete search history.

(56) References Cited

U.S. PATENT DOCUMENTS 5,473,700 A     12/1995   Fenner, Jr.
7,501,834 B2 *  3/2009    Madni ............... H02K 41/0356
                                                              324/658
(Continued)

FOREIGN PATENT DOCUMENTS

EP    1972296 A2    9/2008
EP    2793221 A1    10/2014
(Continued)

OTHER PUBLICATIONS

Office Action dated Sep. 11, 2017 in Japanese Patent Application No. 2016-525605, and English translation thereof.
(Continued)

*Primary Examiner* — Anshu Bhatia
(74) *Attorney, Agent, or Firm* — McDermott Will & Emery LLP

(57) ABSTRACT

A mechanical resonant system includes a voice coil actuator, a payload mass (110A,110B), a driver mass (120A,120B, 120C) and a frame mass (130A,130B,130C). The voice coil actuator includes a bobbin (160), an electrical conductor (170) and a magnet assembly (180,190). The bobbin is made from a material that is electrically nonconductive. The electrical conductor is coupled to the bobbin. The magnet assembly has a housing (180) and a magnet (190) coupled to the housing. At least a portion of the bobbin (160) and at least a portion of the electrical conductor (170) are configured to be positioned within a gap formed by the magnet (190) and the housing (180). The bobbin and the magnet assembly are configured to oscillate when an alternating current is applied to the electrical conductor. The payload mass (110A,110B) is coupled to one of the bobbin and the housing. The driver mass (120A,120B,120C) is coupled to the other of the bobbin and the housing. The frame mass (130A,130B,130C) is coupled to each of the payload mass and the driver mass. The payload mass, the driver mass, and
(Continued)

the frame mass are each independently moveable with respect to one another.

21 Claims, 9 Drawing Sheets

(51) Int. Cl.
    *B01F 15/06*     (2006.01)
    *H02K 3/30*     (2006.01)
    *H02K 9/02*     (2006.01)
    *H02K 9/04*     (2006.01)
    *H02K 33/18*     (2006.01)

(52) U.S. Cl.
    CPC ............... *B06B 1/045* (2013.01); *H02K 3/30* (2013.01); *H02K 9/02* (2013.01); *H02K 9/04* (2013.01); *H02K 33/18* (2013.01); *B01F 2015/061* (2013.01)

(56) References Cited

U.S. PATENT DOCUMENTS 8,905,624 B1 * 12/2014 Howe ................. B01F 11/0266
                                                     366/108
2006/0266967 A1   11/2006  Miura
2008/0199028 A1    8/2008  Takabe et al.
2009/0086416 A1    4/2009  Ishikawa et al.
2010/0096936 A1    4/2010  Bae et al.

FOREIGN PATENT DOCUMENTS

| JP | S52-80640 A | 6/1977 |
| --- | --- | --- |
| JP | 2001-276737 A | 10/2001 |
| JP | 2001-309472 A | 11/2001 |
| JP | 2004-57959 A | 2/2004 |
| JP | 2006-320892 A | 11/2006 |
| JP | 2008-205974 A | 9/2008 |
| WO | 2013089239 A1 | 6/2013 |

OTHER PUBLICATIONS

International Search Report and Written Opinion dated May 26, 2015 in PCT Application No. PCT/US2014/061768 (20 pages).
Office Action dated May 22, 2017 in Japanese Patent Application No. 2016-525605, with English translation thereof.
Office Action dated Dec. 5, 2018 in European Patent Application No. 14796617.0.

* cited by examiner

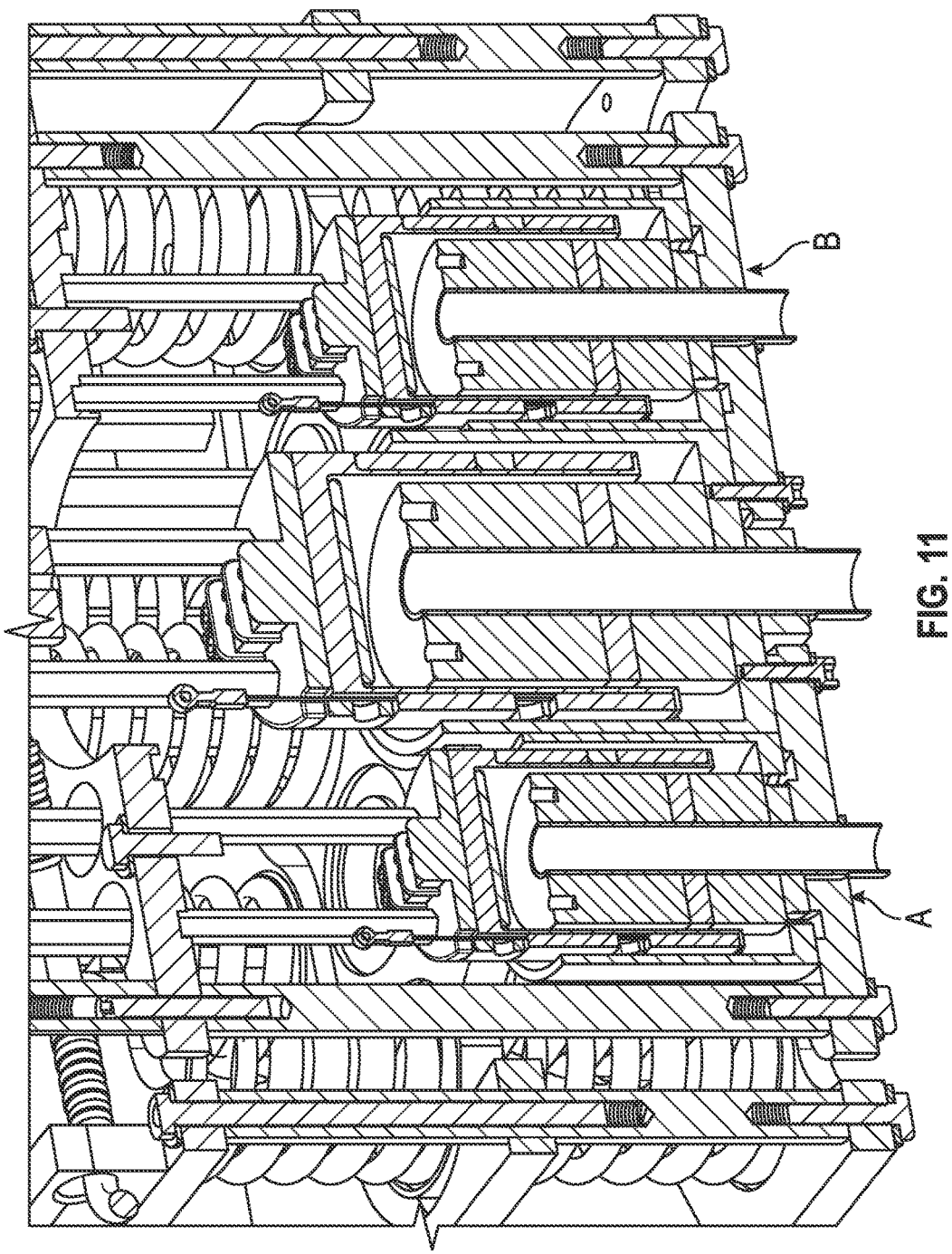

MECHANICAL RESONANT SYSTEM

CROSS-REFERENCE TO RELATED APPLICATIONS

The present application is a U.S. National Stage under 35 U.S.C. § 371 of International Application No. PCT/US2014/061768, filed Oct. 22, 2014, entitled "Mechanical Resonant System", and claims the benefit of U.S. Provisional Patent Application No. 61/894,271, filed Oct. 22, 2013, entitled "Mechanical Resonant System That is Driven by a Non-Electrically Conductive Voice Coil." The entire contents of each of the above applications are incorporated herein by reference.

BACKGROUND

Mechanical resonant systems such as resonant acoustic mixers may include an actuator in the form of a voice coil to drive/operate the system. Typically, the voice coil actuator includes a bobbin and a voice coil winding coupled to (or integrated with) the bobbin. In most mechanical resonant systems, the bobbin is made from a conductive material having a high material strength such as metal (e.g., aluminum, steel, etc.) to withstand the mechanical forces associated with a resonant system. Furthermore, metal bobbins are advantageous because they can dissipate heat effectively due to their high thermal conductivity.

In some applications such as audio speakers, voice coil actuators may include a bobbin made from a non-conductive material such as plastic (e.g., Kapton, etc.). However, voice coil actuators for audio speakers are generally subjected to low mechanical forces, unlike actuators in mechanical resonant systems, which are generally subjected to high mechanical forces. Thus, in a mechanical resonant system, a plastic speaker bobbin cannot withstand the high mechanical forces due to its low material strength. Furthermore, plastic speaker bobbins cannot withstand high temperatures and generally have a low thermal conductivity, making them difficult to cool in high temperature environments, such as in a mechanical resonant system.

SUMMARY

In one aspect, the disclosure relates to a mechanical resonant system. The mechanical resonant system includes a voice coil actuator, a payload mass, a driver mass and a frame mass. The voice coil actuator includes a bobbin, an electrical conductor and a magnet assembly. The bobbin is made from a material that is electrically nonconductive. The electrical conductor is coupled to the bobbin. The magnet assembly has a housing and a magnet coupled to the housing. At least a portion of the bobbin and at least a portion of the electrical conductor are configured to be positioned within a gap formed by the magnet and the housing. The bobbin and the magnet assembly are configured to oscillate when an alternating current is applied to the electrical conductor. The payload mass is coupled to one of the bobbin or the magnet housing. The driver mass is coupled to the other of the bobbin or the magnet housing. The frame mass is coupled to each of the payload mass and the driver mass. The payload mass, the driver mass, and the frame mass are each independently moveable with respect to one another.

In some implementations, the payload mass is coupled to the driver mass by springs, the frame mass is coupled to the payload mass by springs, and the frame mass is coupled to the driver mass by springs. In some implementations, the frame mass is positioned between the driver mass and the payload mass. In some implementations, the frame mass is coupled to a rigid structure by a spring. In some implementations, the system is a vibratory mixer further comprising a platform for receiving a mixing vessel. In other implementations, the system is a chemical reactor further comprising a reaction chamber coupled to the payload mass.

In some implementations, the voice coil actuator is a resistive voice coil actuator configured to generate a resistive load. In some implementations, the electrical conductor includes a plurality of coil wraps coupled to the bobbin. In some implementations, the magnet assembly includes a first group of magnets coupled to the housing and a second group of magnets positioned above the first group of magnets. The first group of magnets are coupled to the second group of magnets by a guide shaft. A magnet from the first group of magnets is arranged with its polarity opposite to the polarity of a magnet from the second group of magnets.

In some implementations, the system includes a cooling system configured to circulate an air flow within the gap formed by the magnet and the housing. In some implementations, the system includes a fan configured to circulate the air flow. In some implementations, the magnet assembly includes a centrally located opening defining a channel and the cooling system is configured to circulate the air flow through the channel to the gap formed by the magnet and the housing.

In some implementations, the bobbin material includes a plastic material. In other implementations, the bobbin material includes a ferrite material. In some implementations, the housing is formed of a magnetically conductive material. In some implementations, the system further comprises a voltage-controlled amplifier configured to drive the voice coil actuator. In other implementations, the system further comprises a current-controlled amplifier configured to drive the voice coil actuator.

In some implementations, the voice coil actuator is a first voice coil actuator, and the system further comprises a second voice coil actuator coupled to one of the payload mass and the driver mass. In some implementations, the second voice coil actuator is configured to operate as a driver for the system by driving the payload mass and the driver mass in phase with the first voice coil actuator. In other implementations, the second voice coil actuator is configured to operate as a brake for the system by driving the payload mass and the driver mass 180 degrees out of phase from the first voice coil actuator.

In another aspect, the disclosure relates to an air-cooled voice coil actuator. The air-cooled voice coil actuator includes a bobbin, an electrical conductor, a magnet assembly and a cooling system. The magnet assembly includes a housing and a magnet. The bobbin is made from a material that is electrically nonconductive. The electrical conductor is coupled to the bobbin. The magnet is coupled to the housing, and the magnet includes a centrally located opening defining a channel. The bobbin is positioned within a gap formed by the magnet and the housing. The bobbin, the magnet, and the housing collectively define a flow path. The bobbin and the magnet assembly are configured to oscillate when an alternating current is applied to an electrical conductor. The cooling system is configured to circulate an air flow through the channel and the flow path.

In some implementations, the opening is positioned along a longitudinal axis of the magnet. In some implementations, the electrical conductor includes a plurality of coil wraps coupled to the bobbin. In some implementations, the air flow is generated by oscillation of the bobbin and the magnet assembly. In some implementations, the magnet assembly includes a first group of magnets coupled to the housing and a second group of magnets positioned above the first group of magnets. The first group of magnets is coupled to the second group of magnets by a guide shaft. A magnet from the first group of magnets is arranged with its polarity opposite to the polarity of a magnet from the second group of magnets.

In some implementations, the cooling system includes a fan configured to circulate the air flow. In other implementations, the cooling system includes a vibratory pumper flap configured to pump the air flow as the bobbin and the magnet assembly oscillate. In some implementations, the bobbin material includes a plastic material. In other implementations, the bobbin material includes a ferrite material. In some implementations, the housing is made from a magnetically conductive material. In some implementations, the actuator includes a voltage-controlled amplifier configured to drive the actuator. In other implementations, the actuator includes a current-controlled amplifier configured to drive the voice coil actuator.

BRIEF DESCRIPTION OF THE DRAWINGS

The above and related objects, features, and advantages of the present disclosure will be more fully understood by reference to the following detailed description, when taken in conjunction with the following figures, wherein:

FIG. 11 is a cross-section view of a mechanical resonant system according to another implementation.

DETAILED DESCRIPTION

Aspects and implementations of the present disclosure generally relate to a mechanical resonant system (e.g., a vibratory mixer, a chemical reactor, etc.). The system includes a voice coil actuator having an electrically non-conductive voice coil bobbin that is used as a driver for the system. Use of an electrically non-conductive bobbin can increase mechanical efficiencies to up to as much as 98% and can decrease the resistive heating, voltage and electrical current of the system. Furthermore, the electrically non-conductive bobbin can eliminate eddy current losses typically associated with electrically conductive voice coil bobbins used in conventional resonant systems. Such eddy currents can cause significant heat energy and power loads on the system which can affect the performance and useful life of the system.

Generally speaking, voice coil actuators are designed to be light so that when they oscillate, the forces generated go into the system and are not absorbed by the inertia of the voice coil mass itself. In order to achieve oscillation at higher frequencies, the mass of the bobbin is typically reduced. However, in a mechanical resonant system, the mass of the voice coil does not affect its ability to input force or motion to the other components in the system because the mass is part of a tuned system. This allows for larger and more heavy voice coils to be used. Thus, it would appear that a metal voice coil bobbin would be an ideal choice as a driver for a mechanical resonant system because weight is not a concern and the metal bobbin has a high material strength to withstand the mechanical forces associated with the system. However, at even moderate frequencies, such as 60 Hz, under high velocities and large magnetic fields, eddy currents are induced in voice coil bobbins made from conductive materials such as metal. Eddy currents generate heat by resistive heating of the conductive material and can account for a significant heat and power load on the resonant system.

Figure 1:
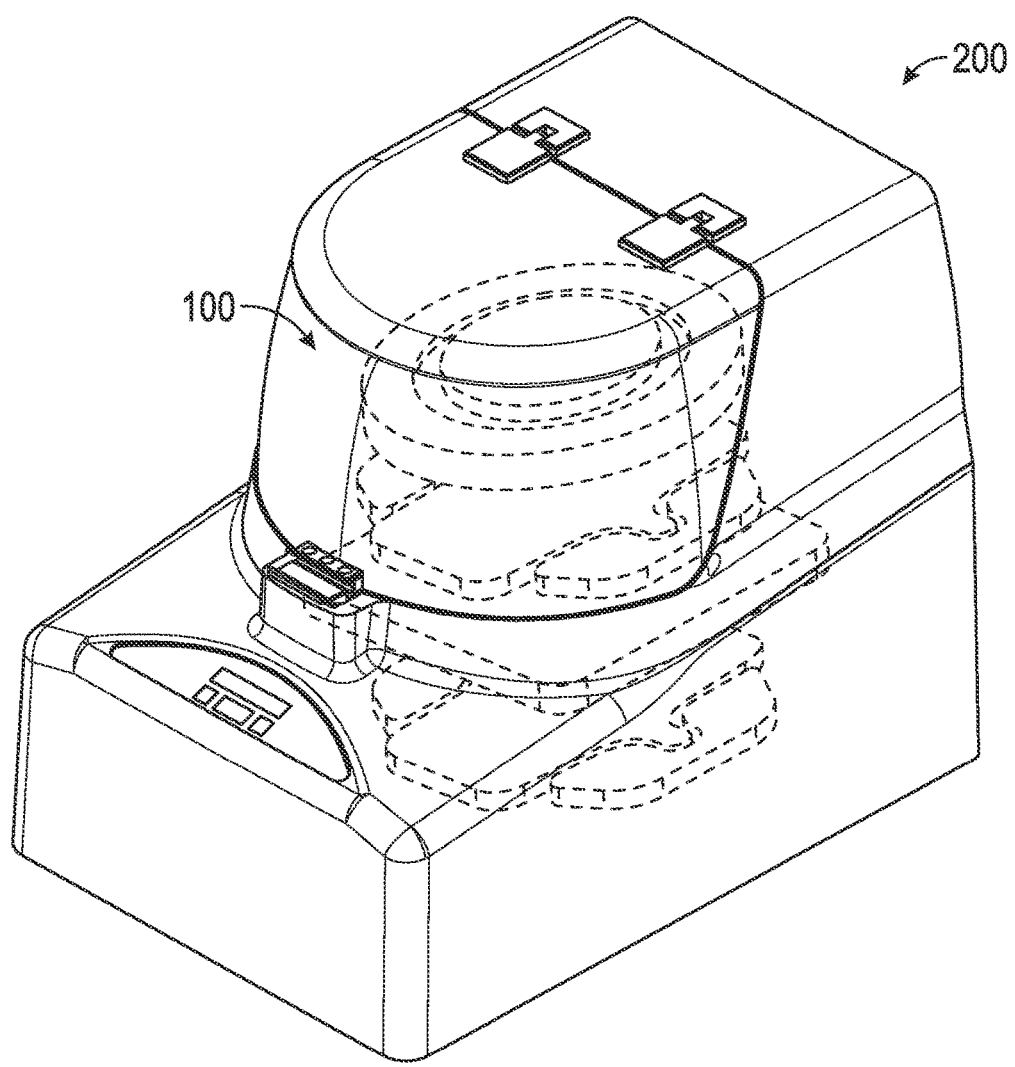
FIG. 1 is a perspective view of a vibratory mixer including a mechanical resonant system.

FIG. 1 is a perspective view of a vibratory mixer 200, shown according to one implementation. The vibratory mixer 200 includes a mechanical resonant system 100 coupled within the mixer 200. The mechanical resonant system 100 is configured to mix various materials in the mixer 200 through oscillation of multiple masses that form part of the resonant system 100. In other implementations, the vibratory mixer 200 is a chemical reactor or another type of system/assembly that can be used in conjunction with the mechanical resonant system 100. For example, in some implementations, the mechanical resonant system 100 is coupled to a reaction chamber of a chemical reactor to facilitate a chemical reaction within the reactor.

Figure 2:
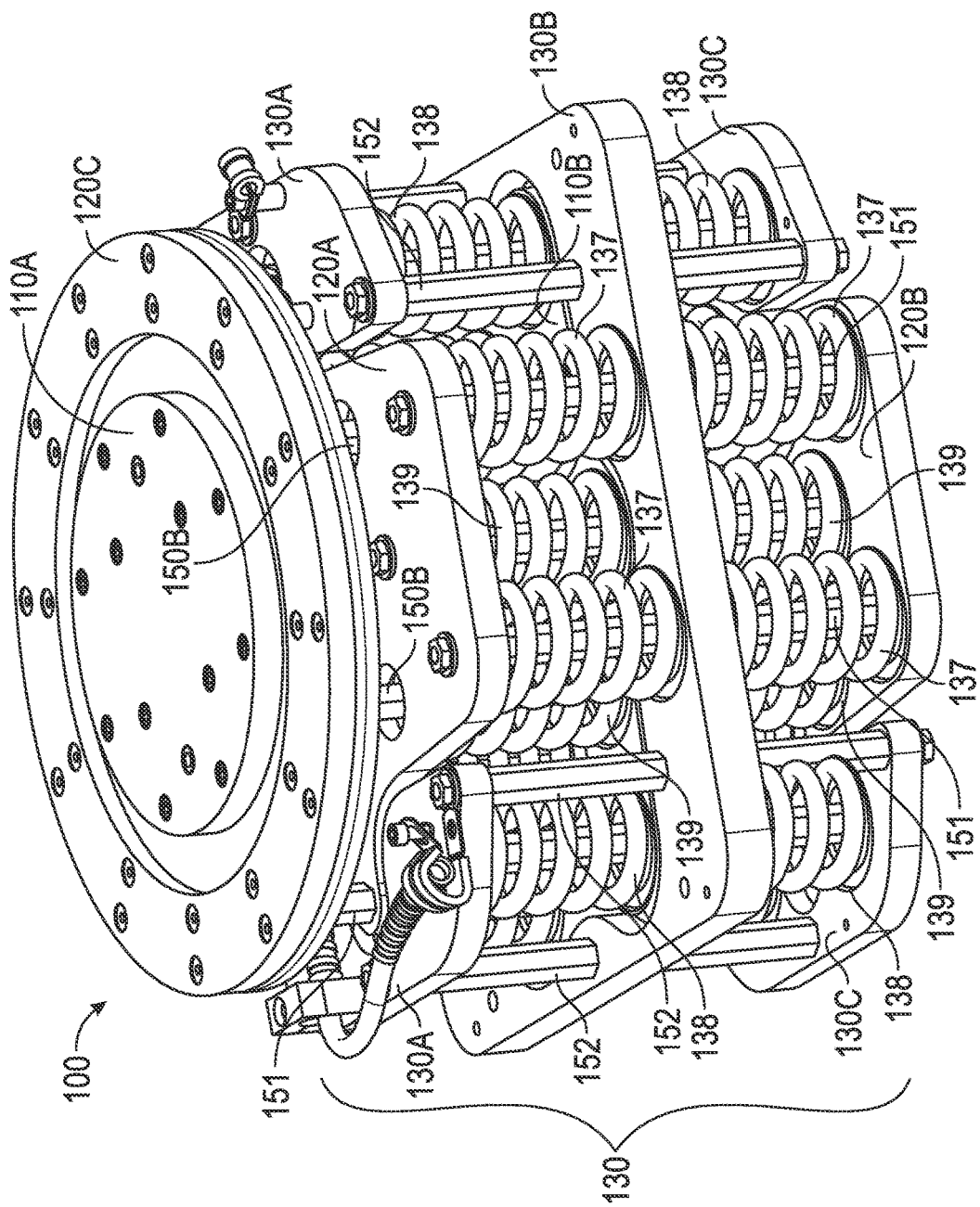
FIG. 2 is a perspective view of the mechanical resonant system of FIG. 1.
Figure 3:
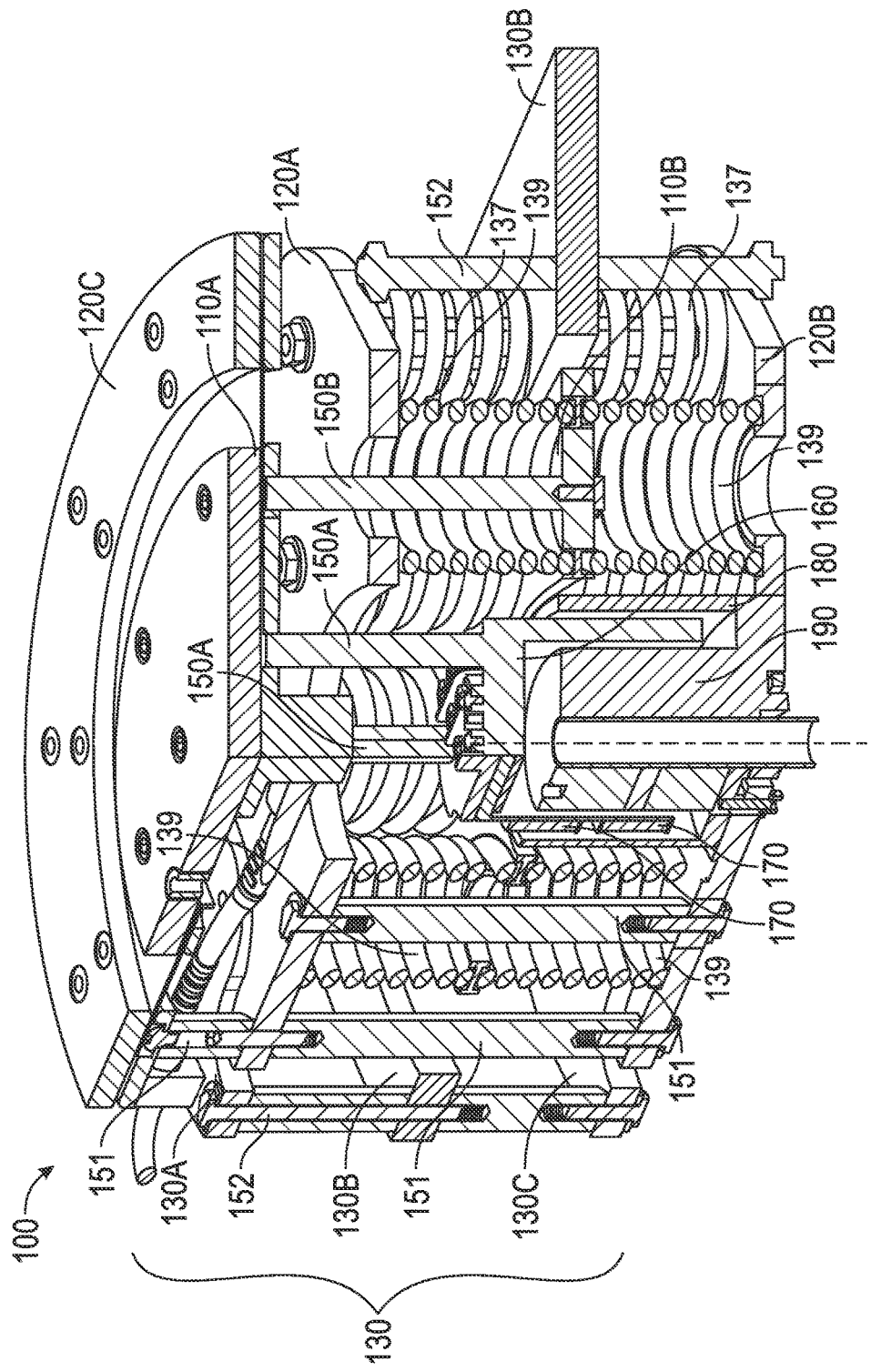
FIG. 3 is a cross-section view of the system of FIG. 2.

FIGS. 2-3 are perspective views of the mechanical resonant system 100 of FIG. 1. As shown in FIGS. 2-3, the mechanical resonant system 100 includes a frame mass 130 configured to be coupled to a rigid structure 131 (shown schematically in FIG. 4). In some implementations, the rigid structure 131 is a wall or a fixed portion of the resonant mixer 200. In some implementations, the frame mass 130 is coupled to the rigid structure 131 by one or more frame-to-rigid structure springs 140 (shown schematically in FIG. 4). In some implementations, the frame-to-rigid structure springs 140 are visco-elastic elements that permit relative movement of the frame mass 130. The frame mass 130 can also be coupled to the ground 132 (e.g., floor, etc.) by one or more frame-to-ground springs 141 (also shown schematically in FIG. 4). In some implementations, the frame-to-ground springs 141 can be visco-elastic elements. As shown in FIGS. 2-3, the frame mass 130 includes upper platforms 130A, a middle platform 130B and lower platforms 130C. Each of the platforms 130A, 130B and 130C are coupled together in a stacked configuration by one or more frame support rods 152 to form the frame mass 130. In other implementations, the frame mass 130 can include more or less structural platforms and/or frame support rods 152.

In the implementation shown in FIGS. 2-3, an upper payload plate 110A is positioned above the middle platform 130B. The upper payload plate 110A is coupled to a lower payload plate 110B by one or more payload support rods 150B. The upper payload plate 110A is positioned above the lower payload plate 110B and has an exposed top surface. The upper payload plate 110A is configured to receive a mixing vessel or reaction chamber including a volume of mixable material for mixing within the resonant mixer 200. The upper payload plate 110A and the lower payload plate 110B cooperatively define part of a payload mass 110 of the resonant system 100 (shown schematically in FIG. 4). The payload mass 110 also includes a bobbin assembly, which is discussed in further detail below. One or more payload-to-frame springs 138 are coupled between the lower payload plate 110B and each of the upper platforms 130A. One or more payload-to-frame springs 138 are also coupled between the lower payload plate 110B and each of the lower platforms 130C. In this manner, the lower payload plate 110B and the upper payload plate 110A are moveable relative to the frame mass 130 (i.e., upper platforms 130A, middle platform 130B and lower platforms 130C) by the payload-to-frame springs 138.

Still referring to FIGS. 2-3, a lower driver plate 120B is positioned below the middle platform 130B. The lower driver plate 120B is coupled to a middle driver plate 120A positioned above the middle platform 130B. The middle driver plate 120A is coupled to an upper driver plate 120C positioned above the middle driver plate 120A. The lower driver plate 120B is coupled to the middle driver plate 120A by one or more driver support rods 151. Likewise, the upper driver plate 120C is coupled to the middle driver plate 120A by one or more driver support rods 151. The middle driver plate 120A, the lower driver plate 120B and the upper driver plate 120C cooperatively define part of a driver mass 120 of the resonant system 100 (shown schematically in FIG. 4). The driver mass 120 also includes a magnet assembly, which is discussed in further detail below. The lower driver plate 120B and the middle driver plate 120A are each coupled to the middle platform 130B by one or more driver to frame springs 137. The driver to frame springs 137 help to regulate the displacement of the driver plates 120A, 120B and 120C relative to the frame mass 130. The driver to frame springs 137 are also configured to guide the movement of the driver plates 120A, 120B and 120C during operation of the resonant system 100. As shown in FIGS. 2-3, each driver support rod 151 is disposed through a respective opening located in middle platform 130B and through a corresponding driver-to-frame spring 137. In this manner, the driver mass 120 (i.e., middle driver plate 120A, lower driver plate 120B and upper driver plate 120C) is independently moveable relative to both the frame mass 130 and to the payload mass 110 (i.e., lower payload plate 110B and upper payload plate 110A).

In the implementation shown in FIGS. 2-3, the payload mass 110 is coupled to the driver mass 120 by one or more payload-to-driver springs 139. In particular, the middle driver plate 120A is coupled to the lower payload plate 110B by one or more payload-to-driver springs 139. Similarly, the lower driver plate 120B is coupled to the lower payload plate 110B by one or more payload-to-driver springs 139. The payload-to-driver springs 139 regulate the displacement of the payload mass 110 and the driver mass 120 when the payload mass 110 and the driver mass 120 are oscillating. Furthermore, the payload-to-driver springs 139 are configured to guide the movement of the payload mass 110 and the driver mass 120 during operation of the resonant system 100. In this manner, the payload mass 110 and the driver mass 120 are independently moveable relative to each other and relative to the frame mass 130.

Figure 4:
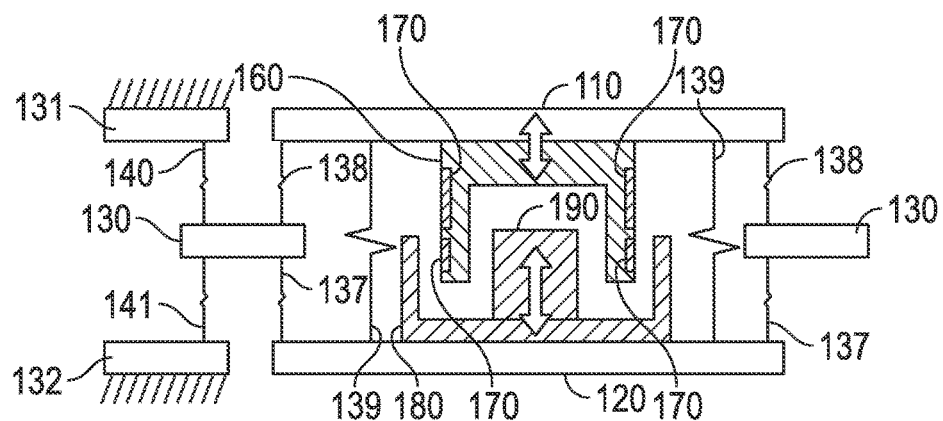
FIG. 4 is a schematic diagram of the system of FIG. 2.

FIG. 4 is a schematic representation of the mechanical resonant system 100, shown according to one implementation. Referring to FIGS. 3-4, the mechanical resonant system 100 includes a voice coil actuator for operating/driving the system (i.e., for driving the payload mass 110 and the driver mass 120). The voice coil actuator includes a bobbin 160 and an electrical conductor 170 coupled to the bobbin 160. In the implementation shown in FIGS. 3-4, the voice coil actuator is positioned within the mechanical resonant system 100 between the payload mass 110 and the driver mass 120. In particular, the voice coil bobbin 160 is coupled to the upper payload plate 110A by one or more voice coil support rods 150A. In other implementations, the voice coil bobbin 160 is coupled to a portion of the driver mass 120 (i.e., middle driver plate 120A or lower driver plate 120B or upper driver plate 120C). The voice coil actuator is configured to receive an electrical signal (e.g., an alternating current) and to generate a force sufficient to drive both the payload mass 110 and the driver mass 120. In some implementations, the voice coil actuator is a resistive voice coil actuator.

Figure 5:
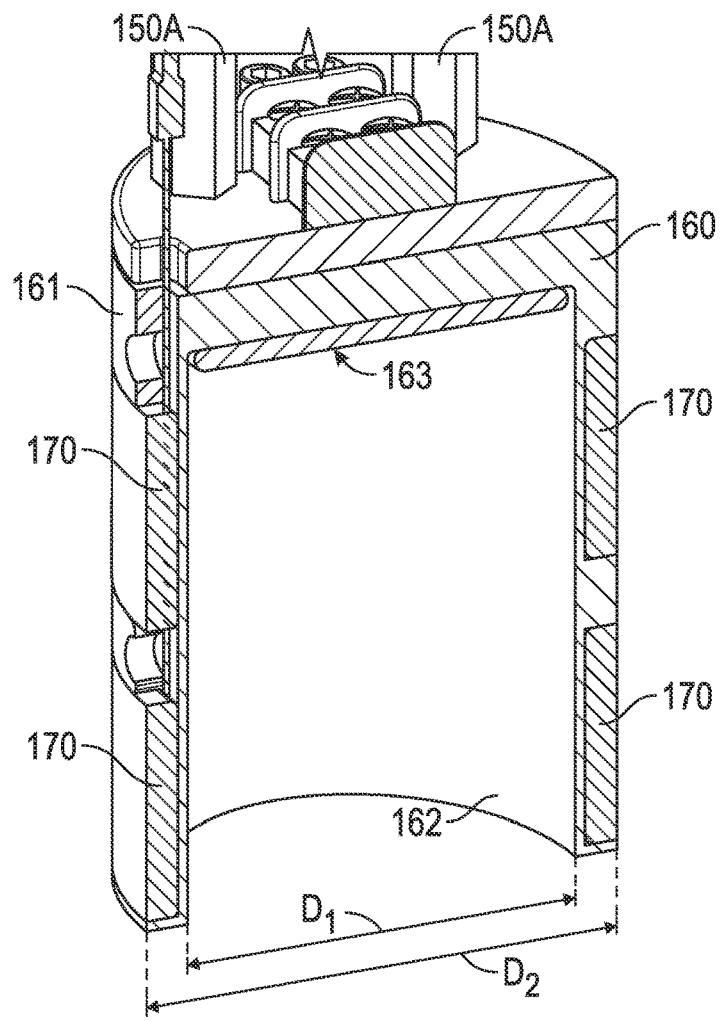
FIG. 5 is a cross-section view of a voice coil actuator.

FIG. 5 is a cross-section view of the bobbin assembly of FIGS. 3-4. As shown in FIG. 5, the bobbin 160 is cylindrical in shape and includes inner circumferential surface 162. The bobbin 160 also includes a plate 163 positioned on a top inner surface of the bobbin 160. The plate 163 is made from a generally rigid material, such as metal, and is configured to couple the bobbin 160 to the voice coil support rods 150A. The plate 163 also provides structural support to the bobbin 160. The plate 163 and the inner circumferential surface 162 collectively define an internal cavity of the bobbin. Bobbin 160 also includes outer surface 161. In one implementation, the bobbin 160 has an inner diameter $D_1$ of less than about 2 inches (50.8 mm) and an outer diameter $D_2$ of less than about 3 inches (76.2 mm) In other implementations, the inner and outer diameters $D_1$ and $D_2$ can be larger or smaller depending on the particular application of the bobbin 160.

In the implementation shown in FIG. 5, the bobbin 160 is made from an electrically non-conductive material. In some implementations, the bobbin 160 is made from a polymer such as a polyetherketon (PEEK) derivative. In some implementations, the bobbin 160 is made from a ferrite material. In some implementations, the bobbin 160 is made from a thermoplastic polyetherimide (PEI) commercially available under the trade name Ultem® produced by Saudi Basic Industries Corporation (SABIC) located in Huntersville, N.C. In other implementations, the bobbin 160 is made from an acetal homopolymer commercially available under the trade name Delrin® produced by E.I. du Pont de Nemours and Company headquartered at 1007 Market Street, Wilmington, Del. In other implementations, the bobbin 160 can be made from another plastic material or combinations of plastic materials suitable for the particular application of the bobbin 160 in the mechanical resonant system 100. It is particularly advantageous to use an electrically non-conductive material for the bobbin 160 because, among other reasons, it allows the mechanical resonant system 100 to achieve mechanical efficiencies of up to 98%.

Figure 6A:
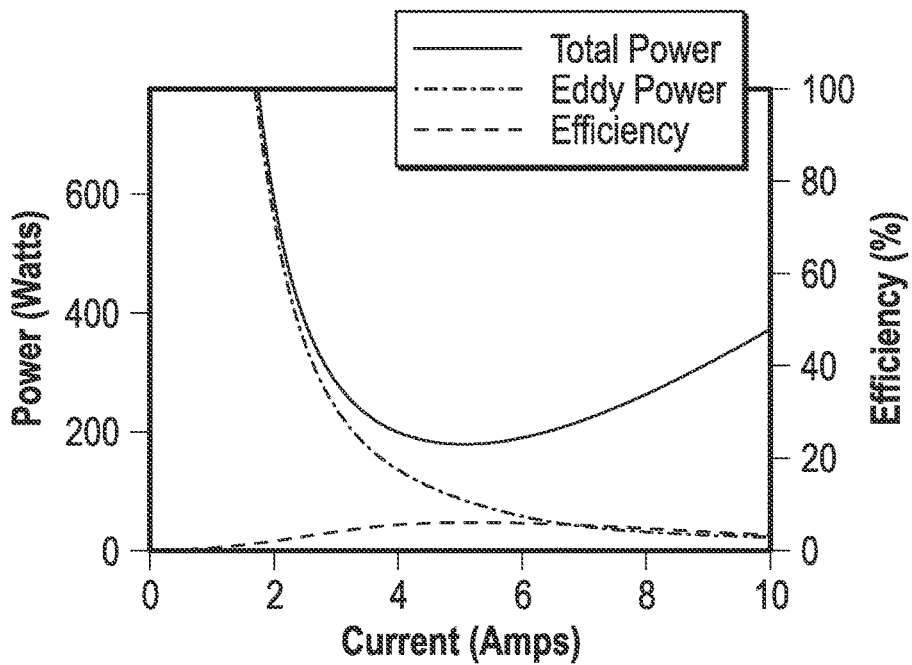
FIG. 6A is a plot showing the mechanical efficiency of a mechanical resonant system using a traditional voice coil actuator having a bobbin made from an electrically conductive material.
Figure 6B:
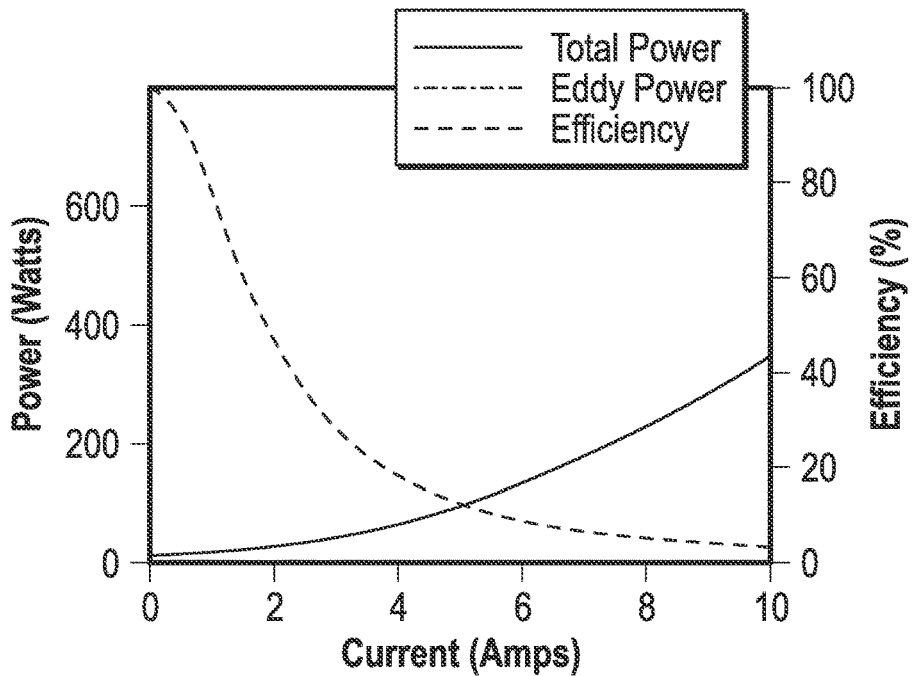
FIG. 6B is a plot showing the mechanical efficiency of a mechanical resonant system using a voice coil actuator having a bobbin made from an electrically non-conductive material.

For example, FIGS. 6A-6B illustrate the mechanical efficiencies of a mechanical resonant system using a voice coil bobbin made from an electrically conductive material (FIG. 6A) and a mechanical resonant system using a voice coil bobbin made from an electrically non-conductive material (FIG. 6B). When an electrically conductive voice coil bobbin is used in the voice coil actuator, the conservation of energy is simplified to the following equation:

$$P_{eddy}|P_{mech}|P_{res}=P_{in}$$

Where the total power going into the voice coil actuator ($P_{in}$) is either converted to mechanical work ($P_{mech}$) or heat in the form of eddy current losses ($P_{eddy}$) or resistive heating of the coil windings ($P_{res}$). The voice coil actuator efficiency is a ratio of the mechanical power to the total power going into the voice coil actuator. For instance, when using an electrically conductive bobbin in a mechanical resonant system, such as the mechanical resonant system 100, then a plot similar to that shown in FIG. 6A is generated where the mechanical work is held constant by adjusting the magnetic flux of the voice coil actuator. As shown in FIG. 6A, at about 4.3 A (amperes), an optimum flux density exists to optimize the electrically conductive voice coil to yield the highest mechanical-to-total power input efficiency. The efficiency of the voice coil actuator is low (i.e., less than 10% at 2 A (amperes)) because of the high amount of both eddy current and coil resistive heat loss.

By contrast, as shown in FIG. 6B, when an electrically non-conductive voice coil bobbin is used in the mechanical resonant system, such as the bobbin 160, then the eddy currents are reduced to zero and the voice coil actuator can operate at the low electrical resistance side of the curve. Ultimately, this results in a much higher mechanical efficiency for the mechanical resonant system 100.

In the implementation shown in FIGS. 3-5, the voice coil bobbin 160 includes an electrical conductor 170 (i.e., coil wires, windings, conductive wires, coil wraps, etc.) coupled to an outer portion of the bobbin 160. In some implementations, the electrical conductor 170 includes a first coil wrap positioned on a lower portion of the bobbin 160 and a second coil wrap positioned above the first coil wrap on the bobbin 160. The first and second coils wraps include conductive wires that are wound in opposite directions from one another. This arrangement advantageously facilitates the electromagnetic interaction between the bobbin 160 and the magnet assembly (discussed below). In other implementations, the electrical conductor 170 is integrated within the outer structure of the bobbin 160. As shown in FIG. 5, the electrical conductor 170 substantially surrounds the bobbin 160 and is exposed along a periphery of the bobbin 160. The electrical conductor 170 is operatively coupled to a source (e.g., a current-controlled amplifier, a voltage-controlled amplifier, etc.) and is configured to receive an electrical signal from the source to generate a force sufficient to drive the system 100.

Referring to FIGS. 3-4, the voice coil actuator further includes a magnet assembly coupled to the driver mass 120. In some implementations, the magnet assembly is coupled to the lower driver plate 120B. In other implementations, the magnet assembly is coupled to at least a portion of the payload mass 110 (i.e., upper payload plate 110A or lower payload plate 110B). As shown in FIGS. 3-4, the magnet assembly includes a magnet housing 180 coupled to the lower driver plate 120B by one or more fasteners 123 (e.g., bolts, nuts, etc.). The magnet assembly also includes a magnet stack 190 coupled within the magnet housing 180.

Figure 7:
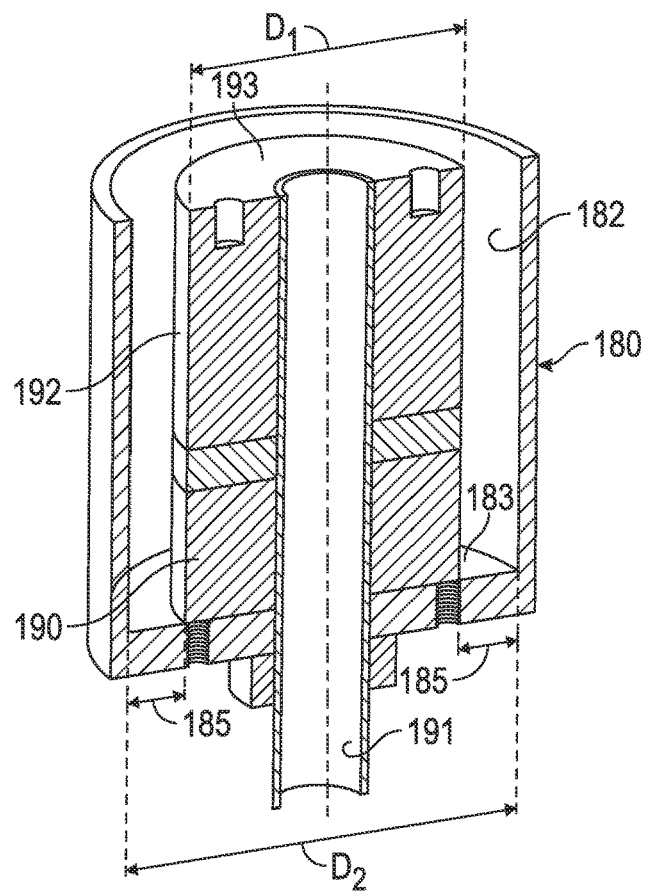
FIG. 7 is a cross-section view of a magnet assembly.

FIG. 7 is a cross-section view of the magnet assembly of FIGS. 3-4. As shown in FIG. 7, the magnet housing 180 is cylindrical in shape and includes inner surfaces 182 and 183 which collectively define an internal cavity of the magnet housing 180. In some implementations, the magnet housing 180 is made from a magnetically conductive material (e.g., metal, steel, etc.). The magnet stack 190 includes a plurality of magnets 195 (shown in FIG. 8) coupled together to form the stack 190. The magnet stack 190 includes an outer surface 192 and a top surface 193. In one implementation, the magnets 195 are coupled together by a guide shaft 191 and a plurality of fasteners (e.g., bolts, nuts, etc.). In some implementations, the guide shaft 191 is made from a non-magnetically conductive material. As shown in FIG. 7, the guide shaft 191 includes a centrally located opening that extends along a longitudinal axis (designated as center line (CL) in FIG. 7) through the entire length of the magnet stack 190, thereby defining a channel through the magnet stack 190. The guide shaft 191 extends past the magnet stack 190 below the lower driver plate 120B. In other implementations, the magnets 195 are coupled together using another type of mechanical fastener suitable to hold the magnet stack 190 together when undergoing high accelerations in the mechanical resonant system 100.

Figure 8:
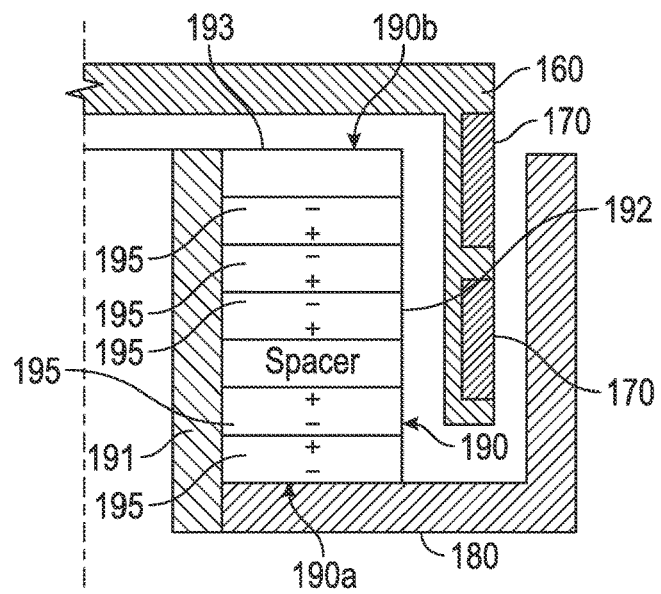
FIG. 8 is a section view of a voice coil actuator and magnet assembly.

In one implementation shown in FIG. 8, five magnets 195 are arranged within the magnet stack 190 extending from a proximal end 190a to a distal end 190b. Two of the magnets 195 are grouped together at the proximal end 190a and are each oriented with their positive end facing upward and their negative end facing downward toward the proximal end 190a. The magnet stack 190 includes a spacer located between the magnets 195 grouped toward the proximal end 190a and three additional magnets 195 grouped together at the distal end 190b. The three magnets 195 grouped together at the distal end 190b are each arranged such that their polarity is opposite to the two magnets 195 grouped together at the proximal end 190a. That is, each of the three magnets 195 grouped together at the distal end 190b are arranged with their negative end facing upward and their positive end facing downward toward the proximal end 190a. In other implementations, the magnets 195 can be arranged in reverse polarity from the arrangement shown in FIG. 8. In other implementations, the magnet stack 190 can include more or less magnets 195 depending on the particular application of the magnet stack 190.

In some implementations, the magnet stack 190 has an outer diameter that is less than an inner diameter of the magnet housing 180 such that the inner surfaces 182 and 183, and the outer surface 192 of the magnet stack 190 collectively define a gap for receiving the bobbin 160. In the implementation shown in FIG. 7, the magnet housing 180 has an inner diameter $D_1$ of about 2 inches (50.8 mm) and the magnet stack 190 has an outer diameter $D_2$ of about 3 inches (76.2 mm) yielding a gap of about ½ inch (12.7 mm) surrounding the outer surface 192 of the magnet stack 190. In other implementations, the diameters of the magnet housing 180 and the magnet stack 190 may be larger or smaller depending on the particular application of the magnet assembly.

Figure 9:
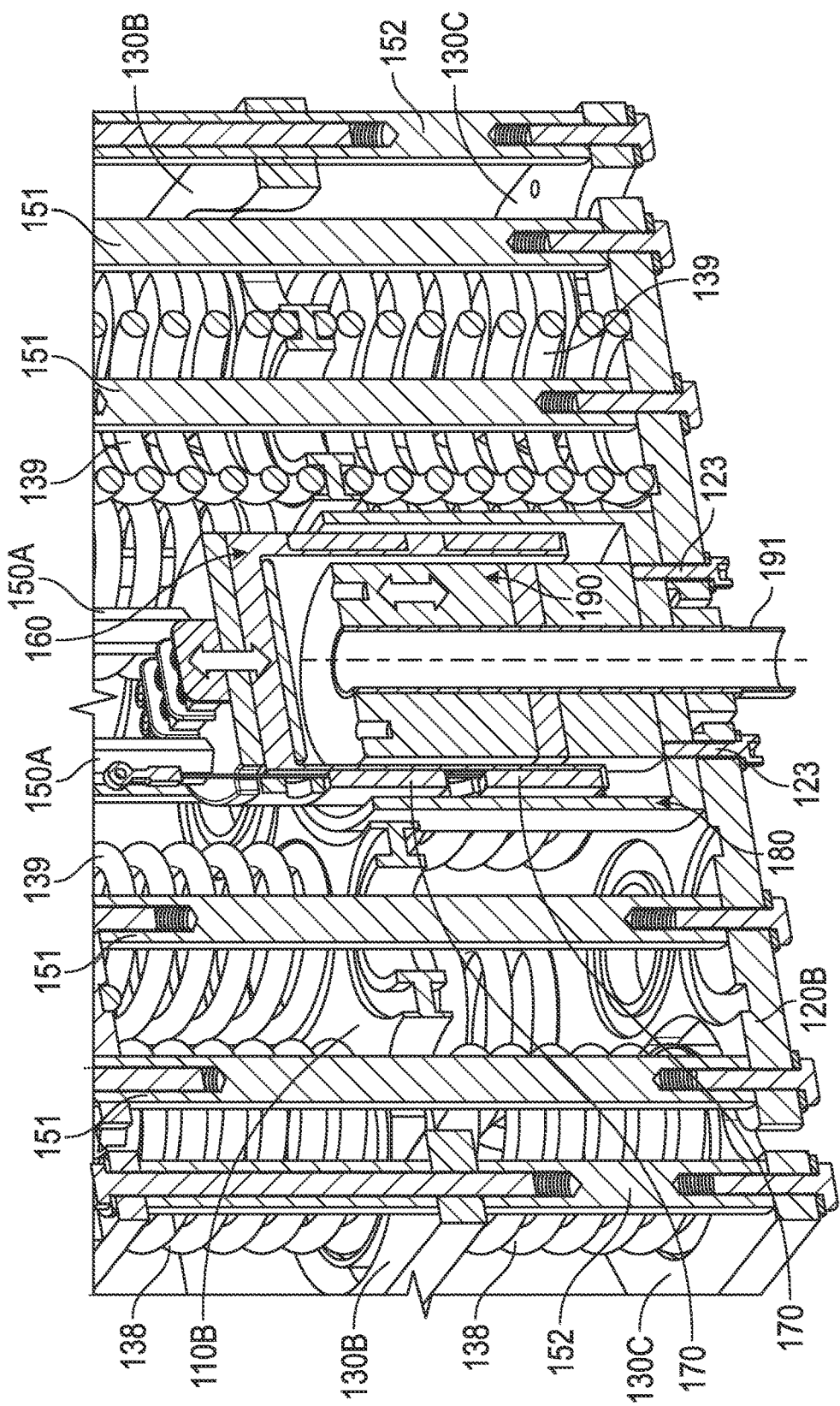
FIG. 9 is a cross-section view of the system of FIG. 2.

FIG. 9 shows the mechanical resonant system 100 at rest (i.e., a non-operated state) with the bobbin 160 disposed within the gap between the magnet housing 180 and the magnet stack 190. As shown, the bobbin 160 is positioned such that at least a portion of the electrical conductor 170 is disposed within the gap between the magnet housing 180 and the magnet stack 190. The gap between the magnet housing 180 and the magnet stack 190 has a width 185 (shown in FIG. 7) sufficient to allow the voice coil actuator to generate a force to cause the bobbin 160 and the magnet assembly to move when an electrical signal is received by the electrical conductor 170. In some implementations, the width 185 is about ½ inch (12.7 mm). In other implementations, the width 185 is larger or smaller depending on the size of the magnets 195 used in the mechanical resonant system 100.

Referring to FIGS. 3-4 and 9, when an alternating current is received by electrical conductor 170, a magnetic flux is generated within the gap between the magnet housing 180 and the magnet stack 190. This in turn results in a force which causes both the bobbin 160 and the magnet assembly (i.e., the magnet housing 180 and the magnet stack 190) to oscillate (represented by respective arrows shown in FIG. 9). The movement of the bobbin 160 and the magnet assembly causes both the payload mass 110 and the driver mass 120 to oscillate. The payload mass 110 and the driver mass 120 are configured to move out of phase from one another. This makes for an ideal condition for providing power to the system 100 because the forces generated by the voice coil actuator are also out of phase. Accordingly, the forces are reacted within the resonant system 100 and are not transferred to the rigid structure 131, unlike traditional voice coil actuated systems, such as audio speakers.

Figure 10B:
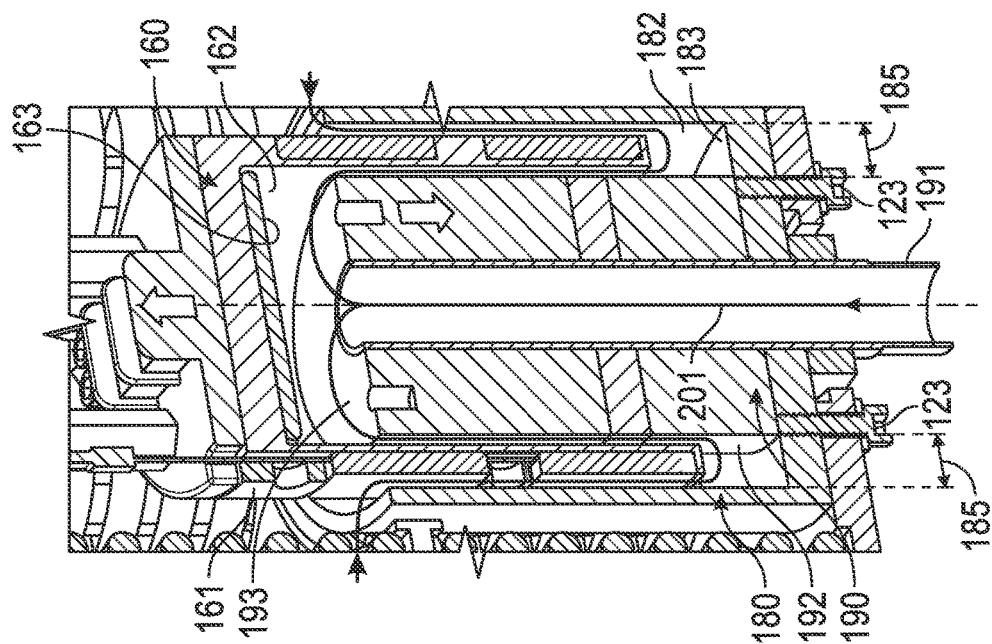
FIGS. 10A-10B are cross-section views of the system of FIG. 2 shown in two different operating states.
Figure 10A:
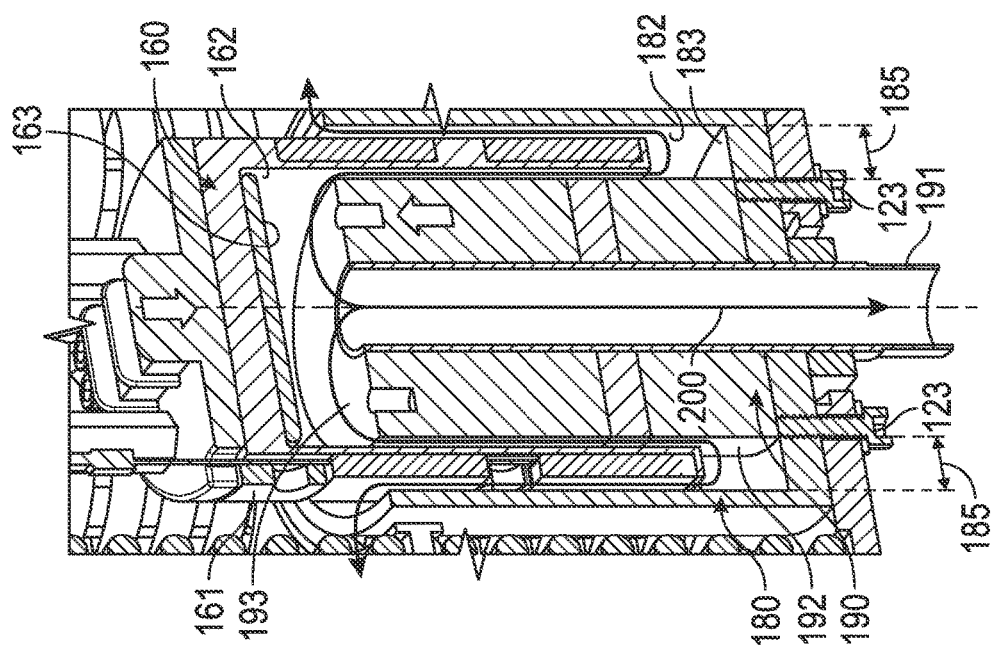

FIGS. 10A-10B are cross-section views of the mechanical resonant system 100 shown at two different operating states. FIG. 10A shows the mechanical resonant system 100 at a first operating state in which the bobbin 160 is moving in a generally downward direction and the magnet assembly is moving in a generally upward direction (represented by arrows shown on bobbin 160 and on magnet stack 190). In one implementation, an air flow 200 is generated by the relative movement of both the bobbin 160 and the magnet assembly. The air flow 200 is configured to travel along a flow path collectively defined by the bobbin 160, the magnet stack 190 and the magnet housing 180 to help reduce the operating temperature of the voice coil actuator (i.e., to cool the electrical conductor 170 of the voice coil actuator) when the system 100 is operating. In some implementations, the air flow 200 is circulated by a fan (e.g., an electric fan, etc.) in communication with the mechanical resonant system 100. In some implementations, the mechanical resonant system 100 includes a vibratory flap or a moveable flap disposed at the opening defined by the guide shaft 191 to operate as a pump for circulating the air flow 200. In some implementations, the oscillation of both the bobbin 160 and the magnet assembly by itself is sufficient to generate the air flow 200.

As shown in FIG. 10A, in the first operating state, the air flow 200 is circulated out of the voice coil actuator along the flow path and away from the magnet housing 180. The air flow 200 is also circulated through the channel defined by the guide shaft 191 toward the opening of the guide shaft 191 away from the bobbin 160. While the air flow 200 is circulating within the flow path defined by the bobbin 160 and the magnet assembly, it is absorbing heat energy generated by the voice coil actuator (i.e., the electrical conductor 170). In this manner, the air flow 200 reduces the operating temperature of the voice coil actuator in the mechanical resonant system 100.

FIG. 10B shows the mechanical resonant system 100 in a second operating state in which the bobbin 160 is moving in a generally upward direction and the magnet assembly is moving in a generally downward direction (represented by arrows shown on bobbin 160 and on magnet stack 190). Here, an air flow 201 travels in a direction that is generally opposite to the direction of the air flow 200 shown in FIG. 10A. That is, the relative movement of the bobbin 160 and the magnet assembly creates a vacuum within the gap between the bobbin 160 and the magnet housing, which causes the air flow 201 to travel through the actuator as shown in FIG. 10B. Through the two operating states shown in FIGS. 10A-10B, the movement of both the bobbin 160 and the magnet assembly generates an air flow sufficient to facilitate cooling of the voice coil actuator. In some implementations, the gap between the bobbin 160 and magnet stack 190 can be increased to reduce air pressure losses. This configuration is possible with an electrically non-conductive voice coil bobbin because there are no eddy current loses and the flux density can thereby be reduced and the gap between the bobbin 160 and the magnet stack 190 can be increased.

FIG. 11 is a section view of a mechanical resonant system 100, shown according to another implementation. In this implementation, one or more additional voice coil actuators are operatively coupled to the mechanical resonant system 100. For example, the mechanical resonant system 100 can include a second voice coil actuator, similar to the voice coil actuator shown in FIG. 5, positioned at location A and/or location B adjacent to the first voice coil actuator (i.e., bobbin 160 and electrical conductor 170). The second voice coil actuator can be coupled to the payload mass 110 (i.e., upper payload plate 110A or lower payload plate 110B), similar to the voice coil actuator of FIGS. 3-4. In some implementations, the second voice coil actuator can be coupled to the driver mass 120 (i.e., middle driver plate 120A or lower driver plate 120B or upper driver plate 120C). In other implementations, one or more additional voice coil actuators can be located at a different position within the mechanical resonant system 100.

In one implementation, the additional voice coil actuator is driven by a separate amplifier such that the actuator generates forces that are 180 degrees out of phase from the motion of the payload mass 110 and the driver mass 120. In this manner, the additional voice coil actuator effectively operates as a braking mechanism for the mechanical resonant system 100. In another implementation, the additional voice coil actuator can be selectively operated to drive the system 100. For example, in some implementations the additional voice coil actuator can be selectively operated to provide additional power/energy to the system 100. Alternatively, the additional voice coil actuator can be selectively turned off when additional power is not needed. In some implementations, the additional voice coil actuator can be selectively switched to brake the system 100 when desired.

In some implementations, the mechanical resonant system 100 can include a second voice coil actuator configured as a driver located at position A and a third voice coil actuator configured as a braking mechanism located at position B. In other implementations, the mechanical resonant system 100 can include two additional voice coil actuators both configured as drivers and located at positions A and B respectively. In other implementations, the mechanical resonant system 100 can include two additional voice coil actuators both configured as braking mechanisms and located at positions A and B respectively. In other implementations, more than two additional voice coil actuators may be located at different positions within the mechanical resonant system 100.

In another implementation, one or more additional driving voice coil actuators can be used to minimize the amount of heat energy lost due to resistive loading in the system 100. For example, if a single voice coil with a 5 ohm load DC resistance is used and the coil has a force constant of 10 lbf/A (pound-force/ampere), the coil will generate 50 lbf (pound-force) with a current of 5 A (amperes). Assuming that the coil is well cooled and that the coil resistance does not change during operation, the resistive heating is calculated from Ohm's Law. Based on that calculation, the resistive heating in the single coil is 125 W (watts). However, if a quantity of four (4) of the same coils are used in parallel, with a current of 1.25 A (amperes) passing through each coil, the resistive heat generated would be 31.25 W (watts), which is a 75% reduction in resistive heat energy generated in the coils.

In some implementations, the voice coil actuator (i.e., bobbin 160 and electrical conductor 170) is controlled/operated using a constant-voltage amplifier. In other implementations, the voice coil actuator is controlled/operated using a constant-current amplifier. Typical control methods for a mechanical resonant system are force based. In a force based system, the system response is a resonant peak at the resonant frequency. However, a non-intuitive system response occurs when a constant-voltage amplifier is used instead of a constant-current amplifier. A constant-voltage amplifier yields a system response through resonance at a constant increasing amplitude with respect to frequency. By contrast, when a constant-current amplifier is used, it yields a sharp increase in amplitude at the resonant frequency. Thus, by using a constant-voltage amplifier, the resonant amplitude gain is removed from the control equation which allows an amplitude gain control to be used with a small correction factor for the changing frequency.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Having described certain implementations, it will now become apparent to one of skill in the art that other implementations incorporating the concepts of the disclosure may be used. Therefore, the disclosure should not be limited to certain implementations, but rather should be limited only by the spirit and scope of the following claims.

What is claimed is:

1. A mechanical resonant system, comprising:
    a voice coil actuator including:
        a bobbin made from a material that is electrically nonconductive,
        an electrical conductor coupled to the bobbin;
        a magnet assembly having a housing and a magnet coupled to the housing,
        wherein at least a portion of the bobbin and at least a portion of the electrical conductor are configured to be positioned within a gap formed by the magnet and the housing, and
        wherein the bobbin and the magnet assembly are configured to oscillate when an alternating current is applied to the electrical conductor;
    a payload mass coupled to one of the bobbin and the housing;
    a driver mass coupled to the other of the bobbin and the housing; and
    a frame mass coupled to each of the payload mass and the driver mass;
    wherein the payload mass, the driver mass, and the frame mass are each independently moveable with respect to one another.

2. The system of claim 1, wherein the following are coupled together by springs:
    the payload mass and the driver mass;
    the frame mass and the payload mass; and
    the frame mass and the driver mass.

3. The system of claim 1, wherein the frame mass is positioned between the driver mass and the payload mass.

4. The system of claim 1, wherein the frame mass is coupled to a rigid structure by a spring.

5. The system of claim 1, wherein the system is a vibratory mixer further comprising a platform for receiving a mixing vessel.

6. The system of claim 1, wherein the system is a chemical reactor further comprising a reaction chamber coupled to the payload mass.

7. The system of claim 1, wherein the voice coil actuator is a resistive voice coil actuator configured to generate a force.

8. The system of claim 1, wherein the electrical conductor includes a plurality of coil wraps coupled to the bobbin.

9. The system of claim 1, wherein the magnet assembly includes:
    a first group of magnets coupled to the housing; and
    a second group of magnets positioned above the first group of magnets;
    wherein the first group of magnets is coupled to the second group of magnets by a guide shaft;
    wherein a magnet from the first group of magnets is arranged with its polarity opposite to the polarity of a magnet from the second group of magnets.

10. The system of claim 1, further comprising a cooling system configured to circulate an air flow within the gap formed by the magnet and the housing.

11. The system of claim 10, further comprising a fan configured to circulate the air flow.

12. The system of claim 10, wherein the magnet assembly includes a centrally located opening defining a channel; and wherein the cooling system is configured to circulate the air flow through the channel to the gap formed by the magnet and the housing.

13. The system of claim 1, wherein the bobbin material includes a plastic material.

14. The system of claim 1, wherein the bobbin material includes a ferrite material.

15. The system of claim 1, wherein the housing is formed of a magnetically conductive material.

16. The system of claim 1, further comprising a voltage-controlled amplifier configured to drive the voice coil actuator.

17. The system of claim 1, further comprising a current-controlled amplifier configured to drive the voice coil actuator.

18. The system of claim 1, wherein the voice coil actuator is a first voice coil actuator, and wherein the system further comprises a second voice coil actuator coupled to one of the payload mass and the driver mass.

19. The system of claim 18, wherein the second voice coil actuator is configured to operate as a driver for the system by driving the payload mass and the driver mass in phase with the first voice coil actuator.

20. The system of claim 18, wherein the second voice coil actuator is configured to operate as a brake for the system by driving the payload mass and the driver mass 180 degrees out of phase from the first voice coil actuator.

21. An air-cooled voice coil actuator, comprising:
   a bobbin made from a material that is electrically nonconductive;
   an electrical conductor coupled to the bobbin;
   a magnet assembly including:
      a housing, and
      a magnet coupled to the housing, the magnet including a centrally located opening defining a channel; and
   a cooling system;
   wherein the bobbin is positioned within a gap formed by the magnet and the housing;
   wherein the bobbin, the magnet, and the housing collectively define a flow path;
   wherein the bobbin and the magnet assembly are configured to oscillate when an alternating current is applied to an electrical conductor; and
   wherein the cooling system is configured to circulate an air flow through the channel and the flow path.

* * * * *